Dec. 2, 1952          W. M. SEVERANCE          2,619,968
                          PEA SHELLER
                      Filed Oct. 20, 1949

*Inventor*
William M. Severance

By *Clarence A. O'Brien*
and *Harvey B. Jacobson*
              *Attorneys*

Patented Dec. 2, 1952

2,619,968

UNITED STATES PATENT OFFICE 2,619,968

PEA SHELLER

William M. Severance, Meridian, Miss., assignor of thirty per cent to A. Leon Cahn and twenty per cent to Edward E. Pylate, both of Meridian, Miss.

Application October 20, 1949, Serial No. 122,418

2 Claims. (Cl. 130—30)

This invention relates to culinary utensils, and more particularly to an instrument adapted to separate the seed from the pod of peas, beans, or other podded vegetables.

An object of this invention is to provide an instrument adapted to easily separate the seed from the pod of certain vegetables.

A further object of the invention is to provide a pea sheller which is capable of expansion so as to be able to aid in the shelling of even the largest size pea pods.

Other objects of the invention reside in the provision of a pea sheller which is strong, durable, efficient in operation, simple in construction, and relatively cheap to manufacture.

These, together with the various ancillary objects of the invention are attained by this pea sheller, a preferred embodiment of which has been illustrated in the accompanying drawings, wherein.

Figure 1:
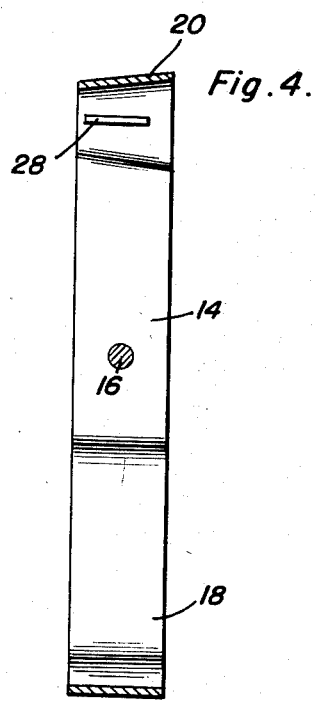
Figure 1 is a perspective view of the novel pea sheller showing it in an operative position.
Figure 5:
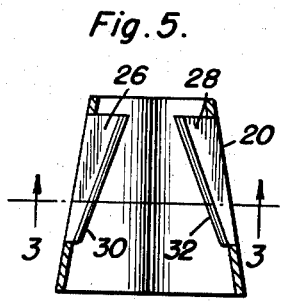
Figure 5 is a horizontal sectional view as taken along line 5—5 in Figure 2.
Figure 4:
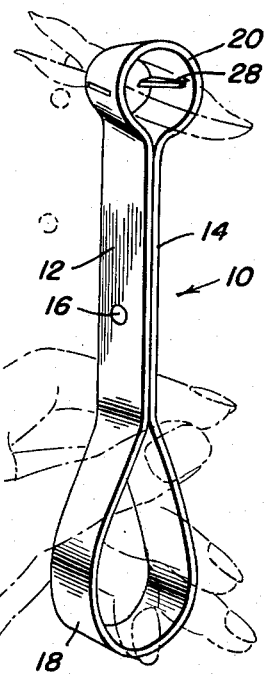
Figure 4 is a vertical sectional view as taken along line 4—4 in Figure 2, and showing in greatest detail, the means for connecting the handle portions comprising elements of the present invention.
Figure 3:
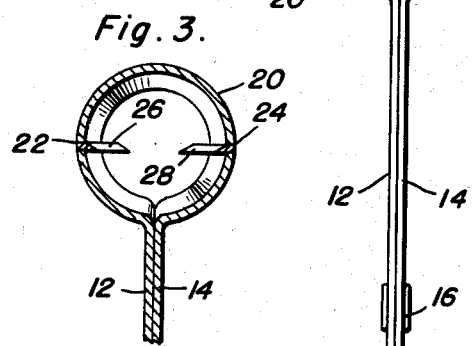
Figure 3 is a vertical sectional view of the device, as taken along line 3—3 in Figure 5.
Figure 2:
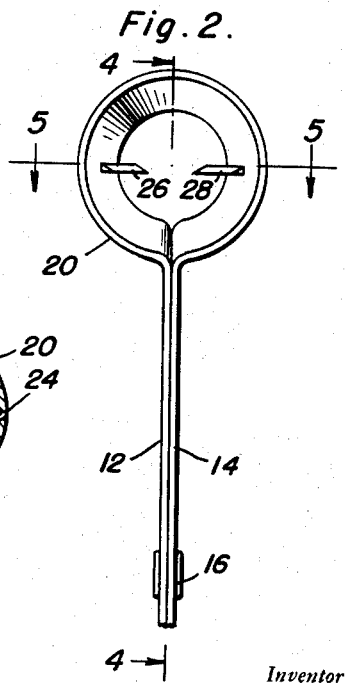
Figure 2 is an elevational view of the pea sheller.

With continuing reference to the accompanying drawings, wherein like reference numerals designate similar parts throughout the various views, 10 generally represents the novel pea sheller comprising the present invention. This pea sheller 10 includes a pair of parallelly disposed handle portions 12 and 14 which are secured together by rivet 16 medially thereof.

One end of the handle portions 12 and 14 are integrally connected to an interconnecting portion 18 which is formed in the shape of a loop for reception of certain fingers of the operator's hand. The other ends of the handle portions 12 and 14 are formed into another interconnecting portion 20. This interconnecting portion 20 has a truncated conical shape and is provided with a pair of slots 22 and 24 which are oppositely disposed therein.

Within the slots are emplaced triangular cutting blades 26 and 28 with their cutting edges 30 and 32 being oppositely disposed. One of the sides of the triangular blades 26 and 28 are emplaced in the slots 22 and 24 respectively. The triangular blades are further placed in such relationship to the conical portion 20 so that the apex of the blades 26 and 28 are convergingly placed more or adjacent to each other because of the narrowing shape of the section 20.

To operate the device, a pod, as shown in Figure 1, is started in through the larger opening of the portion 20. Then the pea pod is easily and quickly pulled through the truncated conical section 20. The cutting edges 30 and 32 will separate the peas from pods in a very efficient manner. It is to be noted that the bolt or rivet 16 is the only securing element which holds the portions 14 and 12 together and therefore, a very flexible instrument is provided. Thusly, a pea of enlarged size may be positioned within the section 20 and the members 12 and 14 will separate enough toward their end for this pea to be properly shelled.

Since from the foregoing, the construction and advantages of this pea sheller are readily apparent, further description is believed to be unnecessary.

However, since numerous modifications will readily occur to those skilled in the art after a consideration of the foregoing specification and accompanying drawings, it is not intended to limit the invention to the precise embodiment of pea sheller shown and described, but all suitable modifications and equivalents may be resorted to which lie within the scope of the appended claims.

Having described the invention, what is claimed as new is:

1. A pea sheller including a pair of parallel flexible bars integrally connected at one end of each by a loop constituting a hollow truncated cone, a single fastener connecting said bars to each other at a distance spaced from said truncated cone to enable radial expansion of the cone, said bars constituting a support for said cone, a pair of opposed blades carried by the loop and extending into the interior of the hollow cone and terminating in spaced relation to each other at a distance to split the pod but not the peas, said blades being disposed on a diameter of the truncated cone which is substantially perpendicular to the longitudinal plane extending medially between said bars whereby said blades are movable from each other upon radial expansion of the truncated cone to accommodate pods of larger diameter.

2. The combination of claim 1 wherein said blades have their cutting edges convergent towards the smaller end of the truncated cone to effect a shearing effect upon a pod.

WILLIAM M. SEVERANCE.

REFERENCES CITED

The following references are of record in the file of this patent:

UNITED STATES PATENTS

| Number | Name | Date |
|---|---|---|
| 870,919 | Wilkinson | Nov. 12, 1907 |
| 1,215,167 | Kemp | Feb. 6, 1917 |
| 1,477,180 | Ladwig | Dec. 11, 1923 |
| 1,633,365 | Ebmeier | June 21, 1927 |
| 2,095,152 | Reynolds | Oct. 5, 1937 |
| 2,446,749 | Evernden | Aug. 10, 1948 |
| 2,500,483 | Black | Mar. 14, 1950 |
| 2,521,115 | Calkins | Sept. 5, 1950 |